April 7, 1953    R. R. ZINDLER    2,633,941
COMBINED SERVICE AND AUXILIARY DISK BRAKE
Filed July 14, 1950    2 SHEETS—SHEET 1
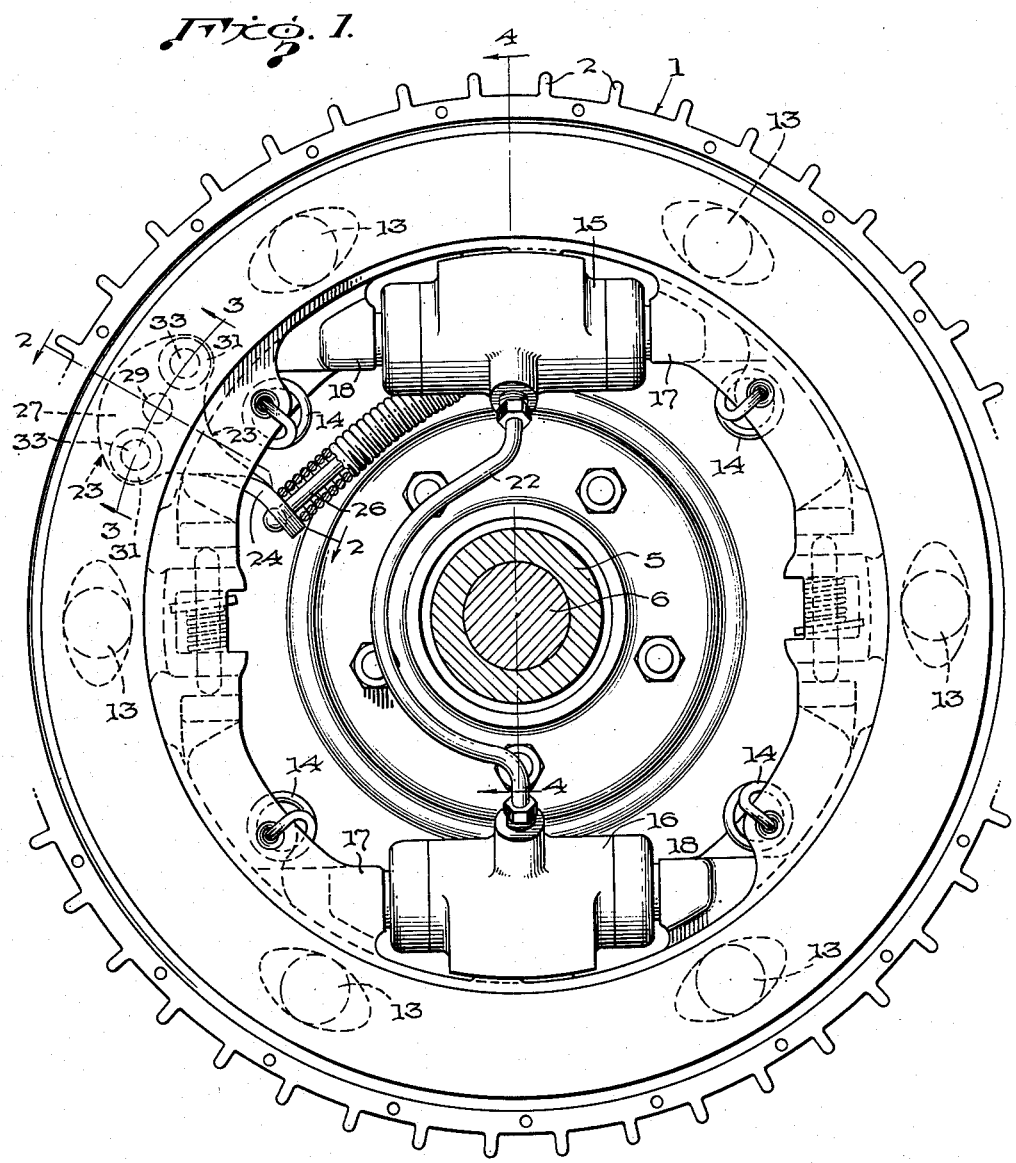
INVENTOR.
R. R. Zindler
BY Robbins Cook
Attorneys April 7, 1953 R. R. ZINDLER 2,633,941
COMBINED SERVICE AND AUXILIARY DISK BRAKE
Filed July 14, 1950 2 SHEETS—SHEET 2
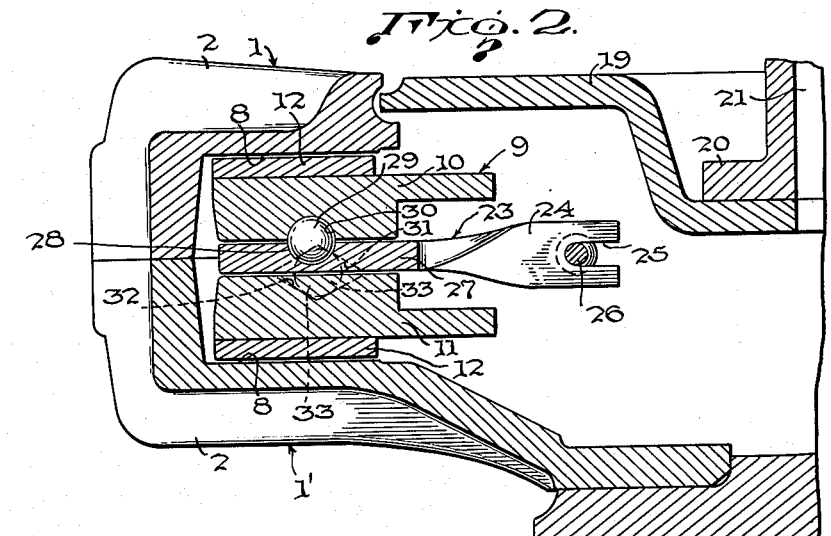
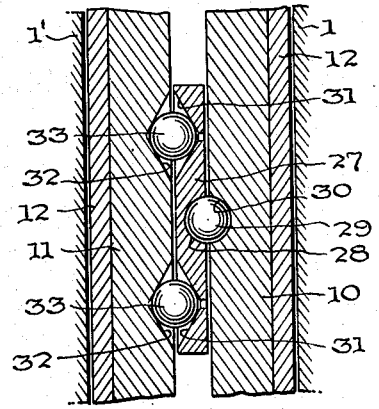
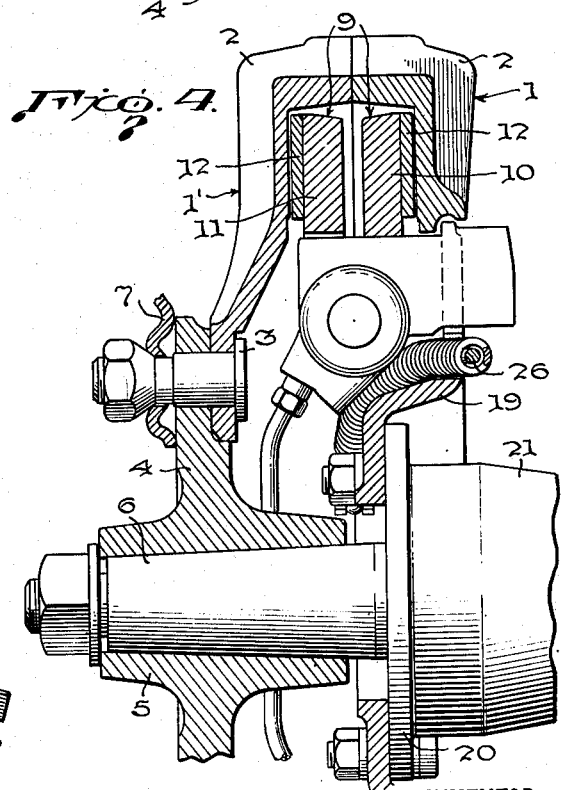
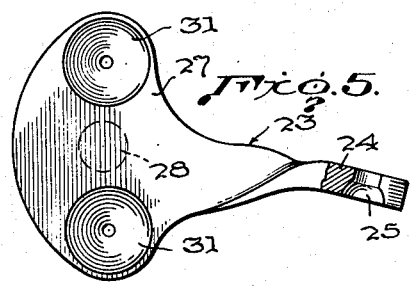
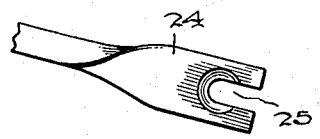
INVENTOR.
R. R. Zindler
BY Robert Cook
Attorneys Patented Apr. 7, 1953

2,633,941

UNITED STATES PATENT OFFICE 2,633,941

COMBINED SERVICE AND AUXILIARY DISK BRAKE

Roger R. Zindler, Benton Harbor, Mich., assignor, by mesne assignments, to Lambert Brake Corporation, St. Joseph, Mich., a corporation of Michigan Application July 14, 1950, Serial No. 173,835

9 Claims. (Cl. 188—106)

The present invention relates to power absorption apparatus, and more especially, to brakes which are primarily adapted for use in braking the wheels of automobiles and other vehicles. However, it is to be understood that the invention is not limited to any specific application, but may be used for other purposes than a vehicle brake.

The motor vehicle laws of most states of this country require that each motor vehicle be provided with an emergency brake, as well as service brakes. The majority of the present day automobiles are equipped with emergency brakes which form a part of the rear wheel brakes, and which may be operated either as an emergency or as a parking brake, and independently of the service brakes.

With the coming to the fore of disc brakes for automobiles and other motor vehicles, with their attendant advantages and improvements over prior conventional brakes of the so-called drum-and-shoe type, it is essential that such disc brakes be so constructed as to provide an effective auxiliary brake action, as required for emergency and parking brakes, as well as provide the regular service brake action.

It is accordingly the primary object of the present invention to provide an effective and inexpensive emergency or parking brake for service brakes of the disc type.

A further object of the invention is to provide an auxiliary brake as aforementioned, which utilizes the same basic principles and elements of the regular disc service brake without necessitating any substantial modification or re-design thereof, and which may be controlled in the same manner and by the same operating instrumentalities as are customarily provided in the majority of present day motor vehicles.

A still further object of the present invention is to provide a simple and novel form of auxiliary brake actuator which may be readily and optionally assembled in the standard disc brake assembly for the motor vehicle wheels so as to provide an emergency or parking brake action for either the front or rear wheels, or both, if desired.

Another object of the invention is to provide an auxiliary brake actuator for disc brakes, which actuator has the form of a lever attachment disposed between the usual opposed discs of the inner double-disc assembly of the brake, said lever being rockably mounted on a relatively stationary ball seating in the inner face of one of said discs and the adjacent face of the lever, and said lever being provided on its opposite face with at least one inclined ramp or conical ball seat disposed in opposed relation to a corresponding inclined ramp or conical ball seat formed in the inner face of the other disc, with a camming ball seated in said opposed seats between the lever and the latter disc, whereby on rocking the lever in one direction, under the control of a suitable hand lever or other operating instrumentality, about the relatively stationary ball aforesaid as a pivot, the other ball will spread the opposed discs of the inner double-disc assembly apart and into braking engagement with the usual rotary brake casing or housing in which the inner double-disc assembly is mounted, and which is fixed to and rotatable with the vehicle wheel to be braked, and on rocking the lever in the opposite direction, the discs of the inner double-disc assembly will disengage the brake casing or housing and release the braking action.

Other and further objects and advantages of the invention will be hereinafter described and the novel features thereof defined in the appended claims.

In the drawings:

Figure 1 is a view in side elevation of a typical disc brake for motor vehicles, with one side of the outer brake casing or housing removed, and showing my new auxiliary brake actuator incorporated therein between the opposed discs of the usual inner double-disc assembly;

Figure 2 is an enlarged, fragmentary sectional view taken on the line 2—2 of Figure 1, through the auxiliary brake actuator;

Figure 3 is an enlarged, fragmentary sectional view taken on the line 3—3 of Figure 1;

Figure 4 is a fragmentary sectional view taken on the line 4—4 of Figure 1;

Figure 5 is an enlarged, detailed view of the auxiliary brake actuator lever; and Figure 6 is a fragmentary, detail, bottom plan view of one end of the actuator lever which is adapted to be connected to the operating cable.

Like reference characters designate corresponding parts in the several figures of the drawings, from which it will be understood that although the brake construction is represented in a form which is more particularly applicable to the front wheels of automotive vehicles, it is not confined thereto and is to be considered as merely illustrative of one embodiment of the invention.

Referring to Figures 1, 2 and 4, I generally denotes the inboard section of a two-part housing or casing which is adapted to be bolted or otherwise rigidly secured at intervals about its outer margin to the outboard section I' of the housing or casing, both sections preferably being provided with cooling ribs or fins 2 for assisting in dissipating the heat generated in the brake during the braking action. In the case of a front wheel brake, the outboard housing section 1' is suitably bolted by a plurality of bolts 3 to the radial flange 4 of a hub 5 which is rotatably mounted on a spindle or axle 6 in the conventional manner, said hub 5 also serving to support the usual vehicle wheel and rim structure, only a fragmentary portion of which is illustrated in Figure 4 and designated 7.

When assembled and mounted in the manner just described, the housing 1, 1' defines within the same two axially spaced and opposed friction surfaces 8, 8, each of which is of annular form, for cooperation with an inner double-disc assembly generally indicated at 9.

Said double-disc assembly 9 includes two discs respectively designated 10 and 11, each of said discs being of annular form and being axially spaced apart as best shown in Figures 2 and 4. The outer faces of the respective discs 10, 11 are preferably provided with friction lining material 12 for cooperation with the opposed friction surfaces of the housing sections 1, 1' in order to provide effective braking action on engagement of the discs 10 and 11 with the outer housing or casing which is rotatable with the vehicle wheel to be braked.

Disposed between the inner discs of the inner double-disc assembly and arranged in equidistantly spaced relation to each other about the axis of the assembly, is a plurality of hardened steel balls as indicated at 13 in Figure 1, said balls seating in oppositely inclined sockets or seats formed in the opposed faces of the respective discs 10, 11, and providing inclined ramps on which the balls are free to roll when one disc is rotated slightly relative to the other. The discs 10, 11 are free to move axially towards and away from each other, as well as rotatively relative to each other, and are normally held together, with the balls 13 therebetween, by means of a plurality of equidistantly spaced, coiled tension springs 14 suitably connected at their opposite ends to the respective inner discs, thereby maintaining the inner discs and balls in the form of a unitary assembly, with the deepest part of the respective ball seats normally opposed to each other and the balls seating therein, so that the discs 10, 11 normally assume a position disengaging the outer casing to afford the necessary running clearance, when the brake is released.

Upon rotating one of the discs 10, 11 relative to the other for a very slight amount, by any appropriate means, the discs will be urged away from each other and spread apart by the camming action of the balls rolling on the inclined seats or ramps, until the discs engage the rotary housing sections 1, 1', at which time, a servo action is imparted to one of said discs, while the other disc is held relatively stationary in the usual manner of disc brakes of this type, this servo action causing the inner discs to more forcibly engage the rotary housing or casing, and thereby produce an effective braking action for the usual service brake purposes.

The service brake operation of the brake is preferably produced by means of two actuators designated 15 and 16 respectively, said actuators having the form of fluid-operated, double-acting cylinders from which pistons are extended at each end of each cylinder, said pistons at one end of each cylinder engaging diametrically opposed lugs or bosses 17, 17 formed on one of the inner discs, and the other pistons of each cylinder engaging a corresponding pair of diametrically opposed bosses 18, 18 on the other inner disc. Thus, the inner disc assembly is freely supported upon the outer ends of the pistons of the respective actuators 15, 16, and freely floats coaxially within the outer rotary housing or casing, while piloting on the actuators 15, 16 which are rigidly mounted and held stationary in any suitable manner, as by means of a backing plate 19 to which the actuators are bolted or otherwise secured, said backing plate being in turn bolted or otherwise secured to a flange 20 at the outer end of the axle 21. Except for the axial and relative rotative movements of the inner double-discs, which movements are only very slight, the inner double-disc assembly is relatively stationary while the outer housing or casing rotates with the wheel to be braked.

The fluid-operated actuators 15 and 16 are interconnected by a pipe or tube 22 to establish pressure communication therebetween, the pressure fluid being admitted to the cylinders by a hydraulic pressure line connected with one of said actuators, and the fluid pressure being controlled in the usual manner by means of a master cylinder (not shown) which is operated by a foot pedal (not shown) in the usual manner of hydraulic service brakes for motor vehicles.

On admission of pressure fluid into the actuators 15 and 16, the opposed pistons in each cylinder will operate to cause relative rotative movement of the discs 10, 11 of the inner disc assembly 9, with resulting axial separation of the discs by the camming action of the balls 13, thereby forcing the inner discs against the rotary casing or housing with a powerful braking effect which is accelerated by the motion of the vehicle in the manner of what is commonly known as a servo action. On release of the brake, the operation of which is controlled by the foot pedal and master cylinder hereinbefore referred to, the tension springs 14 cause the discs 10 and 11 to move axially towards each other pursuant to relative rotation between these discs in the opposite direction to their movement during brake application, with consequent rolling of the balls 13 down the ramps or inclined seats towards the deepest part of the seats, and during this brake-releasing action, the pistons in the actuators 15, 16 are forced inwardly, and the operating fluid is returned to the master cylinder, except for that amount necessary to maintain a slight residual pressure within the actuators, as customary. When the brake is thus released, the discs 10 and 11 will disengage the rotary housing, and remain out of engagement therewith until the brake is re-applied for further service brake application.

The foregoing construction and operation of the service brake generally corresponds to that disclosed in the prior application of Millard B. Lucker et al., Serial No. 116,582, filed September 19, 1949, and is illustrative of one typical form of disc brake construction to which the present invention is applicable, but it is to be understood that the invention of the present application is not limited to brakes of this specific type. Reference will now be made to the auxiliary brake feature with which the present invention is more particularly concerned.

As shown in the drawings, an auxiliary brake actuator lever, generally designated 23, is mounted between the two discs 10, 11 of the inner double-disc assembly 9, as best shown in Figures 1 to 3 inclusive, said lever being disposed in any suitable position substantially midway between any two of the adjacent balls 13 where its operation will not be obstructed by other parts of the brake assembly. The actuator lever 23 is extended at one end to provide a control arm 24 therefor, said control arm being suitably apertured and bifurcated, as indicated at 25, for convenient connection with a control cable 26 or other suitable operating instrumentality leading from the arm 24 through the inner side of the brake assembly. The cable 26 is extended to a point which is conveniently accessible to the operator of the vehicle, and is operatively connected to a lever or other suitable operating instrumentality (not shown), such as an emergency brake lever with which motor vehicles are customarily provided.

At its end opposite the operating arm 24, the actuator lever 23 is enlarged as at 27 so as to provide a relatively broad, flat head, the thickness of which is such that it will be freely accommodated between the discs 10, 11 of the disc assembly 9, with appropriate operating clearance. At one side of the flat head 27 of the operating actuator lever 23, the head is provided with a ball seat 28 in which is seated a relatively stationary hardened steel ball 29 having a diameter substantially less than the diameter of the balls 13. Formed in the inner face of the disc 10 of the inner double-disc assembly, and opposed to the seat 28 in the head 27, is another ball seat 30 in which the ball 29 is seated so as to lie between the head 27 and the adjacent disc 10. The actuator lever 23 is thereby free to rock on the relatively stationary ball 29 which forms a fulcrum or pivotal axis for this lever, as will be obvious from the drawings.

In the opposite face of the head 27 of the actuator lever 23, the head is provided with at least one or more additional ball seats of substantially conical shape, as indicated at 31, two such seats being shown in the drawings, and being respectively located on opposite sides of the pivotal axis of the seat 28. A pair of corresponding seats 32 is formed in the other disc 11 of the inner double-disc assembly 9, with the latter seats 32 arranged in opposed relation to the seats 31, and between each pair of opposed seats 31, 32, there is disposed a hardened steel ball 33, each generally corresponding to the ball 29. Since the seats 31, 32 are oppositely inclined or conical in shape, it will be obvious that by rocking the actuator lever 23 in either direction about the pivotal axis of the relatively stationary ball 29, the balls 33 will exert a camming action on the discs 10, 11 of the inner disc assembly 9, thereby tending to force these discs apart and into frictional engagement with the rotary housing or casing 1, 1', such camming action being controlled by the operating cable 26 through which the necessary force may be transmitted from a hand lever or other suitable instrumentality to enable an auxiliary braking action to be applied to the rotary housing of the brake assembly which is rotatable with the vehicle wheel. This auxiliary braking action may be utilized for purposes of an emergency or parking brake, without interfering with or otherwise affecting the normal service operation of the brake assembly.

It will be understood from the foregoing that the auxiliary brake actuator lever 23 is so mounted as to freely float between the discs 10, 11 of the inner double-disc assembly, and at all times is free to rock on the relatively stationary ball 29, with its flat, broad head 27 free to move in a plane intermediate and parallel to the discs 10, 11. Instead of forming the ball seats 28, 30, 31 and 32 directly in the parts as shown in the accompanying drawings, any or all of these seats may be provided in the form of hardened inserts suitably recessed and fixed in these parts.

It will be further understood that the auxiliary brake actuator lever 23 may be optionally assembled or omitted from any one or more of the brake assemblies when used on motor vehicles, so that it may be incorporated in either the front wheel brakes or the rear wheel brakes, or both, as desired, and all without in anywise necessitating alteration or re-design of the brakes, and without affecting their function for ordinary service brake purposes. I have thus provided an exceedingly simple and effective auxiliary brake mechanism for disc brakes, and which is relatively inexpensive and easy to install so as to afford a combined service and auxiliary brake operation.

While the specific details have been herein shown and described, the invention is not confined thereto as changes and alterations may be made without departing from the spirit thereof as defined by the appended claims.

I claim:

1. A combined service and auxiliary disc brake of the class described, comprising a rotatable member having opposed axially spaced friction surfaces, a relatively stationary inner double-disc assembly coaxially arranged between the opposed friction surfaces of the rotary member aforesaid, the discs of said double-disc assembly being slightly rotatable relative to each other and also being axially shiftable towards and away from each other and the opposed friction surfaces of the rotatable member, camming means between the discs of said inner disc assembly for axially shifting said discs responsive to slight rotation of one disc relative to the other, service brake actuator means operatively coacting with said discs for effecting relative rotation thereof, and an auxiliary brake actuator disposed between said discs and including means operatively engaged with said discs for axially shifting the same towards and away from the opposed friction surfaces of the rotary member independently of the service brake actuator means.

2. A combined service and auxiliary brake as defined in claim 1, wherein the service brake actuator means is of the fluid pressure operated type, and the auxiliary brake actuator is of the mechanical type.

3. A combined service and auxiliary disc brake of the class described, comprising a rotatable member having opposed axially spaced friction surfaces, a relatively stationary inner double-disc assembly coaxially arranged between the opposed friction surfaces of the rotary member aforesaid, the discs of said double-disc assembly being slightly rotatable relative to each other and also being axially shiftable towards and away from each other and the opposed friction surfaces of the rotatable member, camming means between the discs of said inner disc assembly for axially shifting said discs responsive to slight rotation of one disc relative to the other, service brake actuator means operatively coacting with said discs for effecting relative rotation thereof, and an auxiliary brake actuator coacting with said discs for axially shifting the same towards and away from the opposed friction surfaces of the rotary member independently of the service brake actuator means, said service brake actuator means being of the fluid pressure operated type, and the auxiliary brake actuator comprising mechanically operable camming means interposed between the discs of the inner double-disc assembly.

4. A combined service and auxiliary disc brake of the class described, comprising a rotatable member having opposed axially spaced friction surfaces, a relatively stationary inner double-disc assembly coaxially arranged between the opposed friction surfaces of the rotary member aforesaid, the discs of said double-disc assembly being slightly rotatable relative to each other and also being axially shiftable towards and away from each other and the opposed friction surfaces of the rotatable member, camming means between the discs of said inner disc assembly for axially shifting said discs responsive to slight rotation of one disc relative to the other, service brake actuator means operatively coacting with said discs for effecting relative rotation thereof, and an auxiliary brake actuator coacting with said discs for axially shifting the same towards and away from the opposed friction surfaces of the rotary member independently of the service brake actuator means, said service brake actuator means being of the fluid pressure operated type, and the auxiliary brake actuator comprising an actuator lever member disposed between the discs of the inner double-disc assembly, said lever member being pivotal on one of said discs, and camming means interposed between said lever member and the other disc and operable responsive to pivotal movements of said lever member to cause relative axial movements of said discs.

5. A combined service and auxiliary disc brake of the class described, comprising a rotatable member having opposed axially spaced friction surfaces, a relatively stationary inner double-disc assembly coaxially arranged between the opposed friction surfaces of the rotary member aforesaid, the discs of said double-disc assembly being slightly rotatable relative to each other and also being axially shiftable towards and away from each other and the opposed friction surfaces of the rotatable member, camming means between the discs of said inner disc assembly for axially shifting said discs responsive to slight rotation of one disc relative to the other, service brake actuator means operatively coacting with said discs for effecting relative rotation thereof, and an auxiliary brake actuator coacting with said discs for axially shifting the same towards and away from the opposed friction surfaces of the rotary member independently of the service brake actuator means, said service brake actuator means being of the fluid pressure operated type, and the auxiliary brake actuator comprising an actuator lever member disposed between the discs of the inner double-disc assembly, said lever member being pivotal on one of said discs, and ball camming means interposed between opposed inclined seats formed in the lever member and the other disc and operable responsive to pivotal movements of said lever member to cause relative axial movements of said discs.

6. A friction unit for disc brakes and the like, comprising a pair of coaxial discs disposed in parallel spaced relation to each other and movable rotatively and axially relative to each other, camming means between said discs for limiting the axial spacing thereof and for axially separating the discs apart responsive to slight rotation of one disc relative to the other, yieldable means interconnecting said discs and normally urging the same towards each other, each of said discs being provided with means for imparting rotative thrusts thereto pursuant to service brake operation thereof, and an auxiliary brake actuator disposed between said discs and pivotal about a relatively fixed axis for causing axial movements of said discs towards and away from each other independently of relative rotation of said discs.

7. A friction unit as defined in claim 6, wherein the auxiliary brake actuator is pivotal about a relatively stationary ball seating in one face of the actuator and the opposed face of one of said discs, and the opposite face of said actuator is provided with camming means coacting with the opposed face of the other disc, said camming means being operable responsive to pivotal movements of said actuator.

8. A friction unit as defined in claim 6, wherein the auxiliary brake actuator is pivotal about a relatively stationary ball seating in one face of the actuator and the opposed face of one of said discs, and the opposite face of said actuator is provided with camming means coacting with the opposed face of the other disc, said camming means having the form of a ball seating between inclined surfaces formed on the faces of the actuator and said other disc, respectively.

9. A friction unit as defined in claim 6, wherein the auxiliary brake actuator is pivotal about a relatively stationary ball seating in one face of the actuator and the opposed face of one of said discs, and the opposite face of said actuator is provided with camming means coacting with the opposed face of the other disc, said camming means having the form of a ball seating between conical seats formed on the faces of the actuator and said other disc, respectively.

ROGER R. ZINDLER.

REFERENCES CITED

The following references are of record in the file of this patent:

UNITED STATES PATENTS

| Number | Name | Date |
| --- | --- | --- |
| 1,713,549 | Ott | May 21, 1929 |
| 2,185,435 | Goepfritch | Jan. 2, 1940 |
| 2,209,772 | Goepfritch et al. | July 30, 1940 |
| 2,336,350 | Fields et al. | Dec. 7, 1943 |
| 2,351,952 | Goepfritch | June 20, 1945 |
| 2,451,325 | Eksergian | Oct. 5, 1948 |
| 2,526,149 | Myers et al. | Oct. 17, 1950 |
| 2,539,090 | Leland | Jan. 23, 1951 |